Sept. 18, 1956  P. P. DEAN  2,763,797
OVERLOAD PROTECTION FOR ELECTRIC MOTOR WORM DRIVE
Filed March 7, 1955
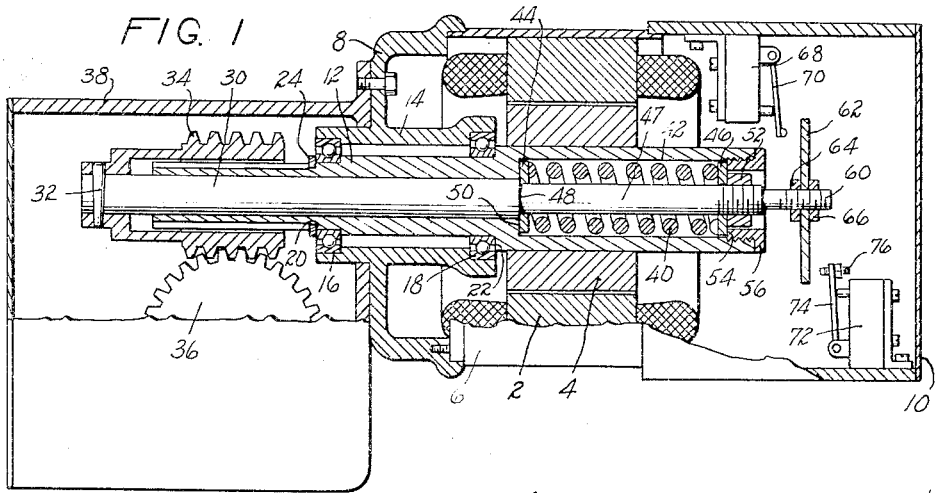
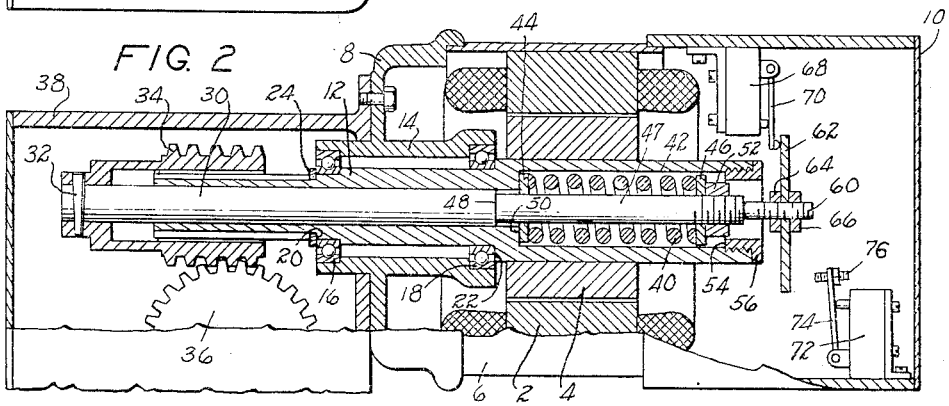
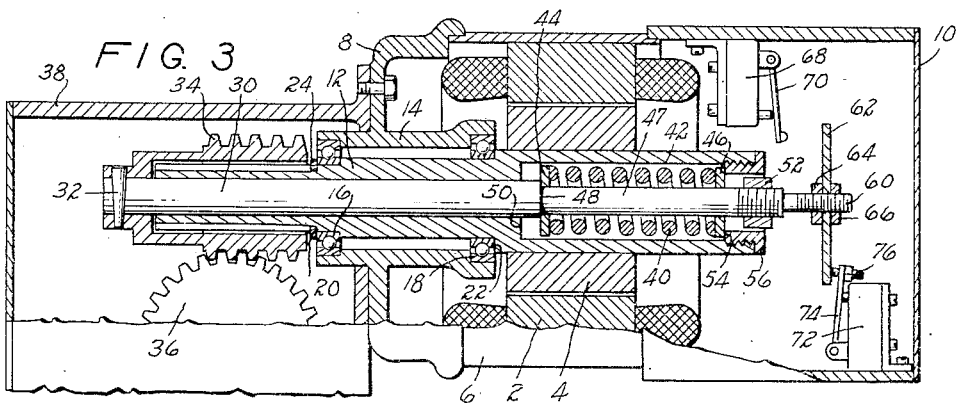
INVENTOR
PETER PAYNE DEAN
BY
*Lindsey and Prutzman*
ATTORNEYS

United States Patent Office

2,763,797
OVERLOAD PROTECTION FOR ELECTRIC MOTOR WORM DRIVE

Peter Payne Dean, Westbrook, Conn.

Application March 7, 1955, Serial No. 492,590

10 Claims. (Cl. 310—68)

This invention relates to improvements in automatic overload protection for electric motor worm drives.

One object of the invention is to provide an overload protective mechanism for electric motor worm drives which is instantly operative in response to overload torque to shut off the motor power.

Another object is to provide in an electric motor worm drive an overload responsive protective mechanism which is effective during operation of the drive in both directions.

Another object is to provide an overload responsive cut-off of the character described which may be conveniently adjusted to operate at various degrees of overload.

Another object is to provide an overload responsive protective mechanism which, when once effective to shut off the drive motor, cannot be inadvertently reset.

Another object is to provide an improved electric motor worm drive having a self-contained overload responsive power shut-off, operative in both directions of rotation of the drive, which is simplified and rugged in construction, low in cost, and compact in size.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

Figure 1 is a longitudinal sectional view of an electric motor drive having an overload responsive protective mechanism constructed in accordance with the present invention;

Figure 2 is a view similar to Figure 1 showing the relation of the parts after the drive has been shut off in response to overload during operation in one direction; and Figure 3 is a view similar to Figure 1 showing the relation of the parts after the drive has been shut off in response to overload during operation in the other direction.

Referring to the drawing, an electric motor drive constructed in accordance with the invention includes a motor having a stator 2 and a rotor 4. The stator is mounted in a tubular frame 6 closed at one end by a supporting housing 8 and closed at its other end by an axially extending cover 10. The rotor is carried by the motor shaft 12, which extends through a tubular support 14 formed in the wall of the housing and, to save space at the right-hand side of the rotor, is journaled exclusively in support 14 in spaced ball bearings 16, 18. The shaft 12 is securely supported against axial movement relative to the housing by shoulders 20, 22 on the shaft and a locking ring 24.

Slidably supported in an axial throughbore in motor shaft 12 is an inner shaft 30 which projects somewhat from the outer end of the motor shaft. The driving worm 34 is fixed on the projecting portion of the inner shaft by a key 32 and is splined or keyed to the outer end of motor shaft 12 for rotating therewith and axial sliding movement relative thereto. The worm meshes with a worm wheel 36 rotatably supported in a casing 38 attached to the housing, and connected to the output shaft of the drive, not shown.

The inner shaft 30 is yieldably supported against axial movement in both directions relative to motor shaft 12 by a single compression spring 40. The spring 40 is carried directly by the motor shaft 12 itself in a cylindrical chamber 42 counterbored in the inner end of the motor shaft, and acts between a washer 44 and a washer 46. Washer 44 is slidable on a reduced diameter portion 47 of inner shaft 30 and, in the relative positions of the shafts shown in Figure 1, abuts a radial shoulder 48 formed by portion 47 and a registering radial shoulder 50 in the motor shaft. Washer 46 is slidable on portion 47 and, in the position of the shafts shown in Figure 1, is retained by a nut 52 in abutting relation with a registering shoulder 54 formed by a ring 56 threaded into the end of the motor shaft 12. It may thus be seen that the single spring 40 acts between the motor shaft and the inner shaft to resist axial displacement of the inner shaft in both directions from its relative position shown in Figure 1. However, if sufficient axial force is applied to the inner shaft to overcome spring 40, the inner shaft may move relative to the motor shaft in either direction, movement in the left-hand direction being accompanied by compression of the spring between washer 46 and washer 44 which is held stationary against the shoulder 50, and movement in the right-hand direction being accommodated by compression of the spring between the washer 44, moved by shoulder 48, and washer 46 held stationary by threaded ring 56.

With this arrangement the reactive thrust of the worm wheel 36 on the worm 34 is transferred to the motor shaft 12 through washers 44, 46 and the spring 40, the spring force being sufficient under normal loads to hold the worm on the motor shaft 12 in the relative axial position shown in Figure 1. When the load on the worm wheel exceeds the desired limit, however, such as when the driven apparatus encounters an obstruction or reaches the limit of its travel, further rotation of the worm no longer turns the worm wheel but causes the spring 40 to yield and displaces the worm 34 and inner shaft 30 axially relative to the motor shaft. If the direction of rotation of the motor is such that the worm wheel 36 has been turning clockwise, worm 34 will be displaced to the left as shown in Figure 2, carrying with it the inner shaft and compressing the spring between the washer 46 and washer 44, which is held stationary by the shoulder 50. Likewise, when the motor has been driving worm wheel 36 in a counterclockwise direction and overloading results, the worm and shaft 30 are displaced in a right-hand direction as shown in Figure 3.

The inner shaft 30 has a threaded extension 60 which projects from the chamber 42 and on which a disc 62 is adjustably secured by nuts 64, 66. Cooperating with the disc 62 is a switch 68 mounted on the cover 10 at the left-hand side of the disc and arranged to control the power for operating the motor, as well as a visual or audible alarm signal, if desired. Switch 68 is normally closed and has an operating arm 70 normally axially spaced from the disc 62 on the left side thereof, as shown in Figure 1. Another similar switch 72 has an operating arm 74 provided with an adjusting screw 76 normally axially spaced from disc 62 at the right side thereof. With this arrangement it will be apparent that axial movement of the shaft 30 and disc 62 to the left or right will operate the corresponding switch 68, 72 and shut off the motor.

The operation of the motor drive is believed to be readily apparent from the above description, but it will be summarized briefly. The motor shaft 12 drives the worm 34, which in turn drives the worm wheel 36. During normal operation the spring 40 holds shaft 30 and worm 12 in the relative axial position shown in Figure 1, and under these circumstances the disc 62 rotates with inner shaft 30 in the axial position shown in Figure 1 and makes no contact with either switch arm 70 or switch arm 74. When an excessive load is encountered, worm wheel 36 stops turning, further rotation of worm 34 displaces the worm and shaft 30 axially either to the right or left according to the direction of rotation of the motor, and causes disc 62 to operate the corresponding switch 68, 72 to shut off the motor. Convenient adjustment of the spacing between disc 62 and switch arm 70 is afforded by nuts 64, 66, and the spacing between the disc and switch arm 74 may likewise be conveniently adjusted by screw 76 so as to provide motor shut-off at any desired degree of overload in either direction. Once one of the switches 68, 72 has been operated and the motor shut off, the worm wheel will hold worm 34 and shaft 30 in axially displaced position, and disc 62 will hold the switch in the "off" position so that the motor cannot be inadvertently driven any further against the excessive load. Alternatively the switches 68, 72 may be of the self-locking variety which, when once turned off, will remain in the "off" position until reset. Upon operation of the motor in the reverse direction worm 34 and shaft 30 will return to normal position, thereby releasing spring 40 and disengaging disc 62 from both switch arms.

Thus there has been shown and described an overload responsive safety cut-off which is effective instantaneously in response to overload during operation of the drive in both directions. The cantilever mounting of the motor shaft in the support 14 saves space at the right-hand end of the motor, and the location of the worm and spring 40 directly on the motor shaft minimizes the worm thrust and spring stiffness required for a given load limit. Also the location of the spring 40 inside the motor shaft 12 minimizes its diameter and hence minimizes its wire size for a given stiffness. The overload cut-off mechanism is thus extremely compact, requiring no space additional to that for the motor drive itself, and yet is simplified in construction and inexpensive to manufacture.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In an electric motor drive, a hollow drive shaft having a central cavity forming a pair of oppositely facing internal radial shoulders, an axially movable inner shaft extending through the drive shaft and having a pair of external radial shoulders facing in opposite directions in said cavity, spring means in the cavity acting between said internal and external radial shoulders to yieldably restrain said shafts against relative axial movement, a worm fixed on the inner shaft and non-rotatably but axially slidably connected to the drive shaft for axial movement relative thereto responsive to axial thrust exceeding the force of said spring, electric switch means for the motor, and control means for the switch means operable responsive to axial movement of said inner shaft.

2. In an electric motor drive, a hollow drive shaft having an axially extending central cavity forming a pair of oppositely facing internal radial shoulders, an inner shaft axially slidable in the drive shaft extending into said cavity and having a pair of oppositely facing external radial shoulders registrable with said internal shoulders, a coil compression spring in the cavity acting between said internal and external radial shoulders to yieldably restrain said shafts against relative axial movement, a worm connected to the inner shaft and non-rotatably but slidably mounted on the drive shaft for axial movement relative thereto responsive to axial thrust exceeding the force of said spring, an electric switch for the motor, and a control member for the switch operable responsive to axial movement of said inner shaft in either direction.

3. In an electric motor drive, a drive shaft connected to the motor having a central bore provided with an enlarged diameter portion forming a pair of confronting internal radial shoulders, an inner shaft axially slidable in the drive shaft and having a diminished diameter portion forming a pair of confronting external radial shoulders registrable with said internal shoulders, axially slidable washers on said diminished diameter portion each engageable with one of said external shoulders and the corresponding internal shoulder, a coil compression spring in the cavity urging said washers against said shoulders to yieldably restrain said shafts against relative axial movement, a worm fixed to the inner shaft and non-rotatably but slidably connected to the drive shaft for axial movement relative thereto in either direction responsive to axial thrust exceeding the force of said spring, switch means for the motor, and control means for the switch means operable responsive to axial movement of said inner shaft relative to said drive shaft a predetermined distance in either direction.

4. In an electric motor drive, a housing for the motor, a drive shaft extending through the rotor of the motor and the wall of the housing and journaled exclusively in said housing wall, said drive shaft having an axial throughbore provided with an enlarged diameter portion forming a pair of confronting internal radial shoulders, an axially slidable inner shaft extending through the drive shaft and having a diminished diameter portion forming a pair of confronting external radial shoulders registrable with said internal shoulders, a coil compression spring in said enlarged diameter portion acting between said shoulders to yieldably restrain said shafts against relative axial movement, a worm fixed to the inner shaft and non-rotatably but slidably connected to the drive shaft for axial movement relative thereto in either direction responsive to axial thrust on the worm exceeding the force of said spring, a switch for the motor and a control for the switch operable responsive to axial movement of said inner shaft.

5. In an electric motor drive, a motor having a rotor, a drive shaft extending through the rotor and fixed to it, said drive shaft having an axial throughbore provided with an enlarged diameter portion forming a pair of confronting internal radial shoulders, an inner shaft extending through the drive shaft and axially movable relative thereto, said inner shaft having a pair of confronting external radial shoulders disposed in registry with said internal shoulders in a reference axial position of said inner shaft relative to said drive shaft, a coil compression spring surrounding said inner shaft acting between said internal and external shoulders to yieldably restrain said inner shaft from axial movement relative to said outer shaft in either direction, a worm fixed to said inner shaft and non-rotatably but slidably connected to said drive shaft for axial movement relative thereto in either direction responsive to axial thrust exceeding the force of said spring, switch means for the motor, and control means for the switch means operable responsive to movement of the inner shaft from said reference position in either direction.

6. In an electric motor drive, a motor having a rotor, a drive shaft extending through the rotor and fixed to it, said drive shaft having an axial throughbore provided with an enlarged diameter portion forming a pair of confronting internal radial shoulders, an inner shaft extending through the drive shaft and axially movable relative thereto, said inner shaft having a pair of confronting external radial shoulders disposed in registry with said internal shoulders in a reference axial position of said inner shaft relative to said drive shaft, a coil compression spring surrounding said inner shaft acting between said internal and external shoulders to yieldably restrain said inner shaft from axial movement relative to said outer shaft in either direction, a worm non-rotatably and slidably mounted on one end of said drive shaft for axial movement relative thereto in either direction responsive to axial thrust exceeding the force of said spring, means connecting said worm to said inner shaft, an extension on said inner shaft projecting from the other end of said drive shaft and carrying an actuator, switch means for the motor, and control members for the switch means disposed in the path of axial movement of said actuator.

7. In an electric motor drive, a housing for the motor, a drive shaft extending through the rotor of the motor and the wall of the housing and journaled exclusively in said housing wall, said drive shaft having an axial throughbore provided with an enlarged diameter portion forming a pair of confronting internal radial shoulders, an inner shaft extending through the drive shaft and axially movable relative thereto, said inner shaft having a pair of confronting external radial shoulders disposed in registry with said internal shoulders in a reference axial position of said inner shaft relative to said drive shaft, a coil compression spring surrounding said inner shaft acting between said internal and external shoulders to yieldably restrain said inner shaft from axial movement relative to said outer shaft in either direction, a worm non-rotatably and slidably mounted on one end of said drive shaft for axial movement relative thereto in either direction responsive to axial thrust exceeding the force of said spring, means connecting said worm to said inner shaft, switch means for the motor, and control means for the switch means operable responsive to movement of the inner shaft from said reference position in either direction.

8. In an electric motor worm drive, a motor, a hollow drive shaft operated by the motor, an inner shaft received in said drive shaft and slidable axially relative thereto in either direction, a worm disposed coaxially of said drive shaft, means forming a rotative driving connection between said drive shaft and the worm while permitting axial movement of the worm relative to said drive shaft, said inner shaft being connected for rotative and axial movement with the worm, spring means internally of said drive shaft and externally of said inner shaft yieldably positioning said inner shaft in predetermined axial position relative to said drive shaft and resisting axial movement of said inner shaft in either axial direction from said predetermined position, and switch means for the motor operated in response to axial movement of the inner shaft relative to the drive shaft a predetermined distance in either direction.

9. In an electric motor drive, a hollow drive shaft operated by the motor, an inner shaft extending through the drive shaft and movable axially relative thereto, a worm disposed coaxially of said drive shaft and mounted for axial movement relative to the drive shaft, means forming a rotative driving connection between the drive shaft and the worm, said inner shaft being connected to said worm for rotational and axial movement therewith, said drive shaft having an annular cavity surrounding said inner shaft and forming a pair of said oppositely facing internal radial shoulders, means forming a pair of external radial shoulders on said inner shaft facing in opposite direction, a spring in the cavity arranged to act between one of said internal shoulders and the oppositely facing external shoulder to yieldably restrain said inner shaft against axial movement in either direction relative to said drive shaft, a switch for the motor, and a control for the switch operable in response to axial movement of the inner shaft.

10. In an electric motor drive, a drive shaft connected to the motor and having a central bore provided with an enlarged diameter portion extending from one end of said drive shaft and forming a first internal radial shoulder, an inner shaft coaxially disposed within the drive shaft and axially slidable relative thereto, said inner shaft having a diminished diameter portion on one end forming a first external radial shoulder registrable with said first internal shoulder, a cylindrical member threadably received in said one end of said drive shaft and constructed to form a second internal radial shoulder in said bore oppositely facing from said first internal shoulder, a stop member threadably mounted on said one end of said inner shaft and forming a second external radial shoulder registrable with said second internal shoulder formed by said cylindrical member, said stop member being disposed coaxially of said cylindrical member and constructed to be movable axially therethrough, a coil compression spring disposed in said cavity and arranged to act between one of said internal shoulders and the oppositely facing external shoulder, a worm mounted for rotational movement with and axial movement relative to said drive shaft in response to axial thrust exceeding the force of said spring, said inner shaft being connected to said worm for rotational and axial movement therewith, switch means for the motor, and control means for the switch means operably responsive to axial movement of said inner shaft relative to said drive shaft a predetermined distance in either direction.

References Cited in the file of this patent

UNITED STATES PATENTS

| | | |
|---|---|---|
| 1,479,178 | Harvey | Jan. 1, 1924 |
| 1,719,517 | Moore | July 2, 1929 |
| 1,938,720 | Preble | Dec. 12, 1933 |
| 2,261,402 | Nardone | Nov. 4, 1941 |